March 24, 1970     S. R. PORWANCHER     3,502,846
SMOKE GENERATOR
Filed Aug. 9, 1965     5 Sheets-Sheet 1
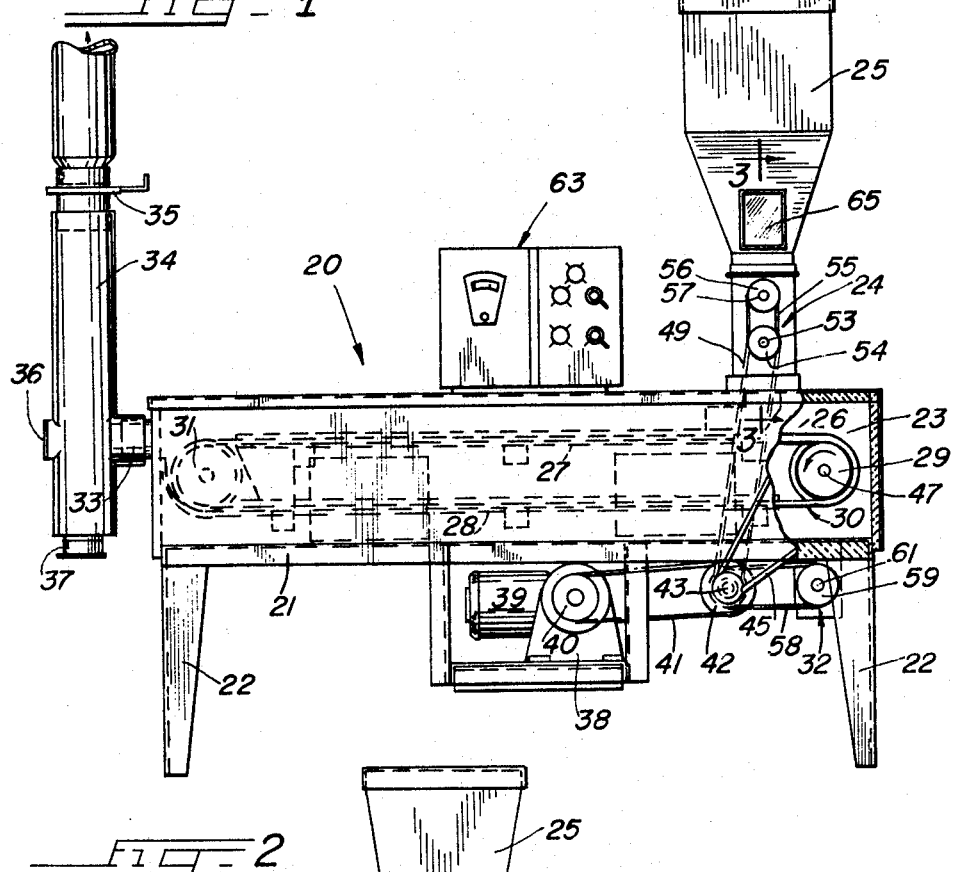
INVENTOR.
SAMUEL R. PORWANCHER
BY Wallace, Kinzer & Dorn
ATTYS.

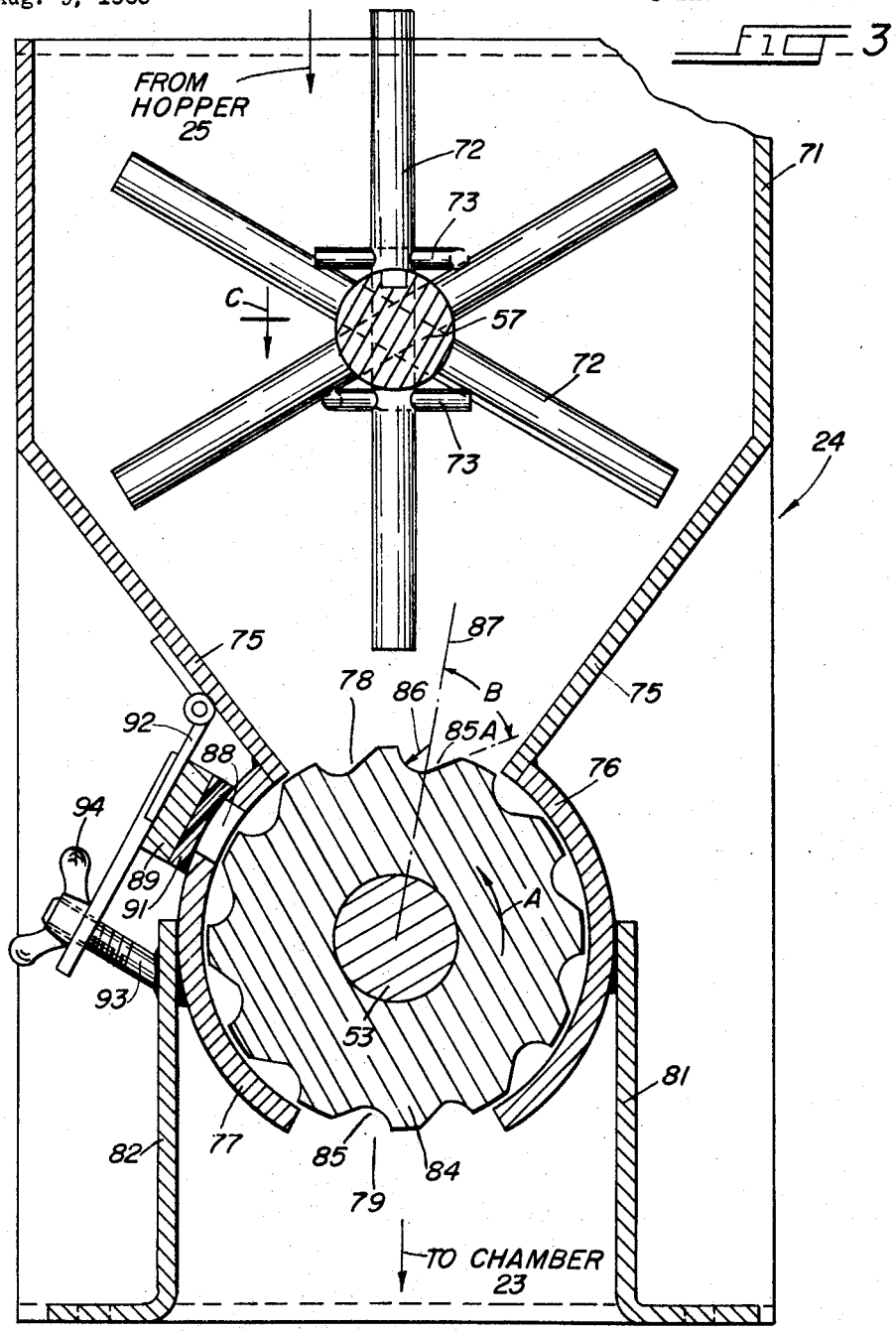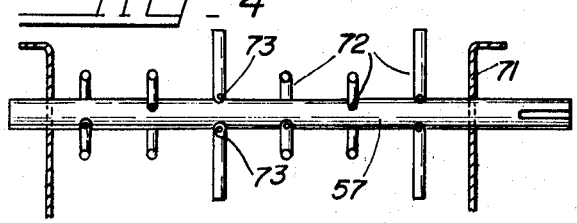

March 24, 1970     S. R. PORWANCHER     3,502,846
SMOKE GENERATOR
Filed Aug. 9, 1965     5 Sheets-Sheet 3
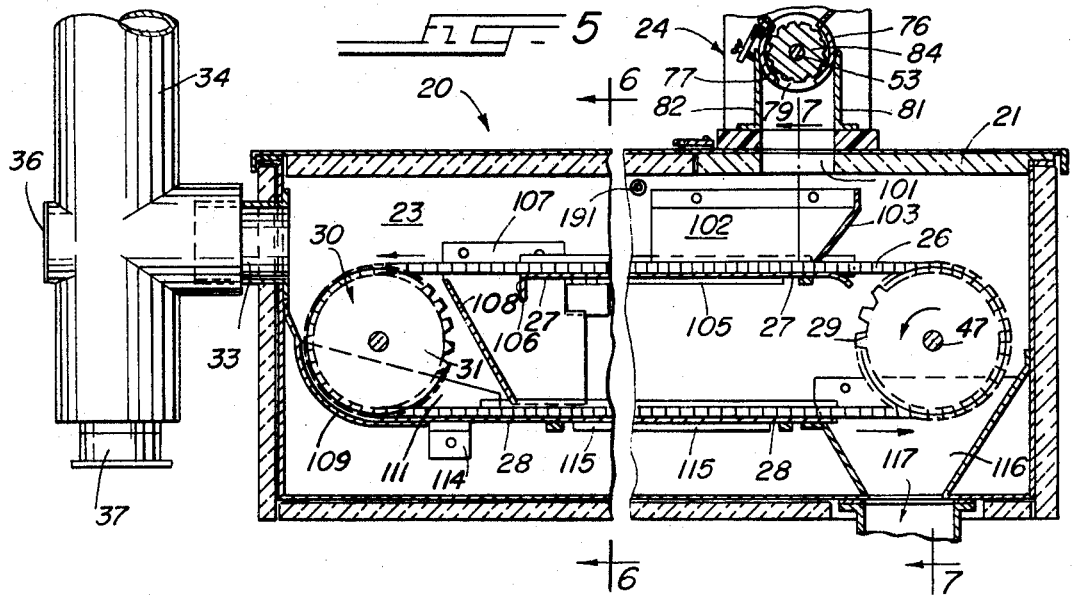
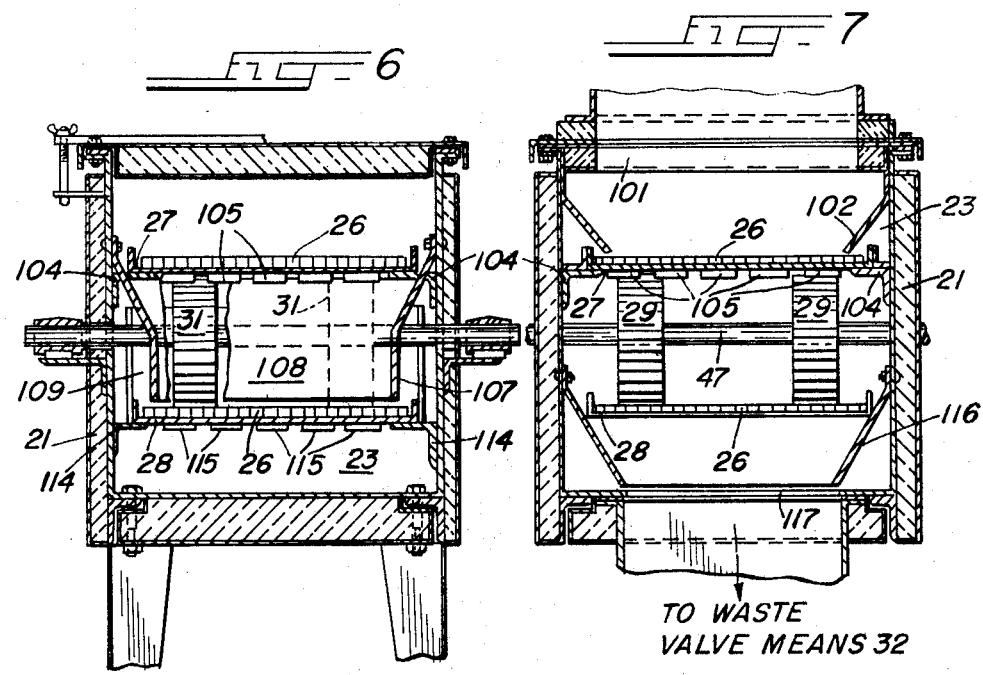
INVENTOR.
SAMUEL R. PORWANCHER
BY
Wallace, Kinzer & Dorn
ATTYS.

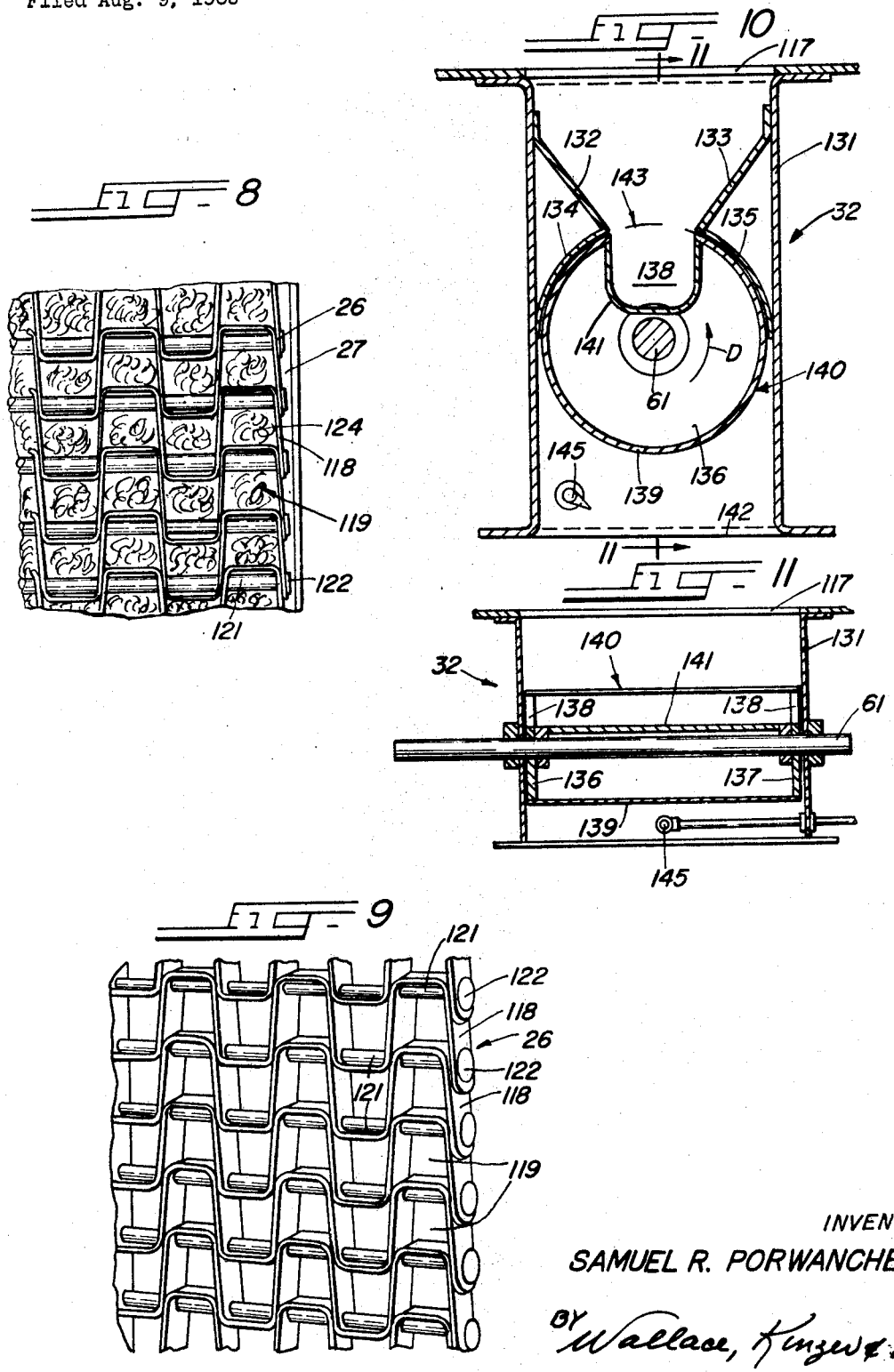

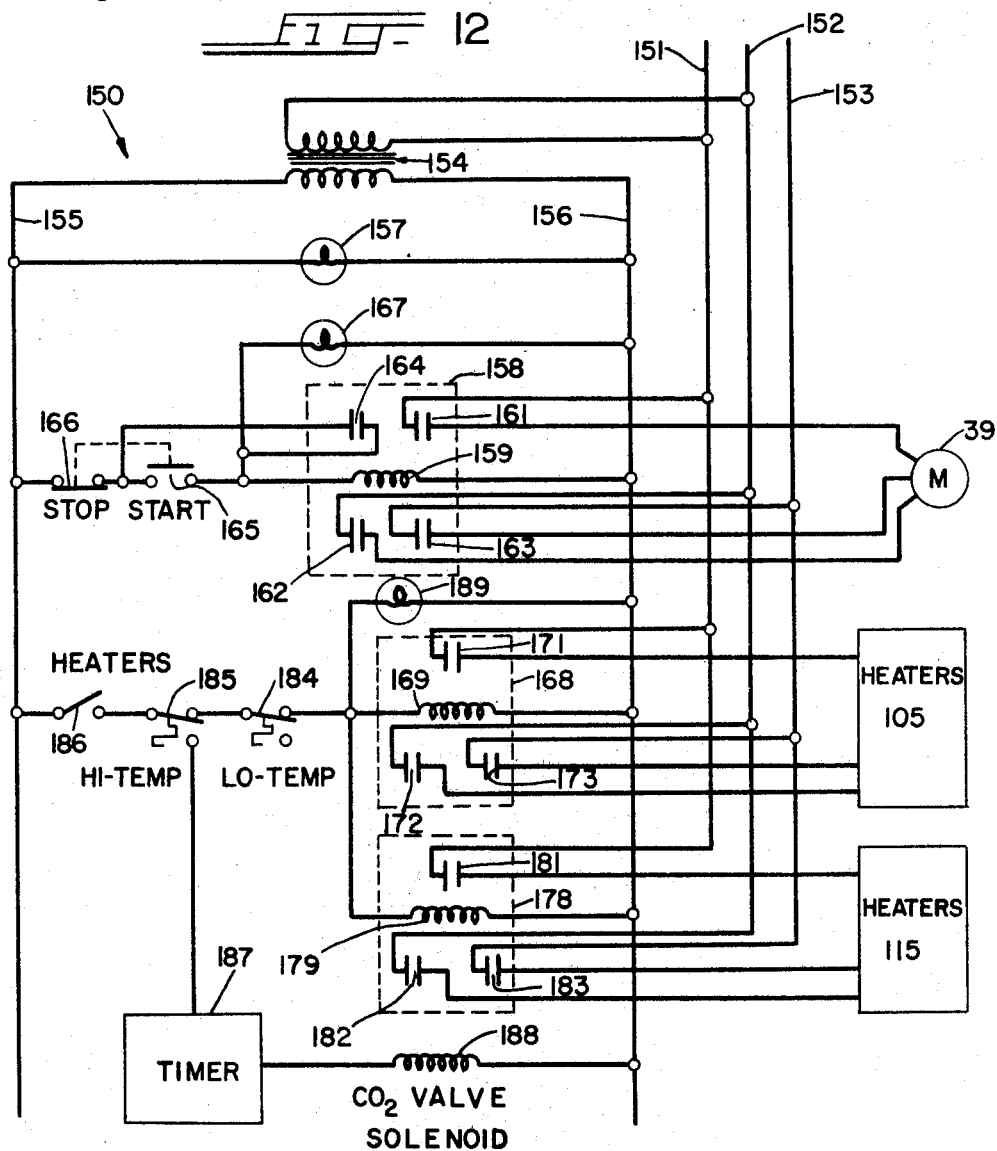

United States Patent Office 3,502,846
Patented Mar. 24, 1970

3,502,846
SMOKE GENERATOR
Samuel R. Porwancher, Chicago, Ill., assignor to Michigan Oven Company, Detroit, Mich., a corporation of Michigan
Filed Aug. 9, 1965, Ser. No. 478,303
Int. Cl. F27b 9/02, 9/04, 9/06
U.S. Cl. 219—388                                        8 Claims

ABSTRACT OF THE DISCLOSURE

A dry smoke generator for food processing applications in which sawdust is deposited into a multiple open cell conveyor at one end of a heated bed plate mounted within an enclosed smoke generation chamber. The conveyor drags the sawdust across the bed plate and the sawdust falls through the end portion of the conveyor onto another run of the same conveyor extending across a second bed plate in the same enclosure. At the end of the second bed plate, the remaining waste product from the sawdust is discharged from the chamber. Inlet and outlet valves are used to maintain an oxygen-starved atmosphere within the smoke generation chamber.

---

This invention relates to a new and improved smoke generator and more particularly to a smoke generator for producing smoke from dry particulate material such as dry sawdust.

In the food industry, and particularly in the treatment of a wide variety of meats and fish, it is necessary to produce substantial quantities of smoke. The smoke is applied to the surface of the food product being treated, usually within a confined treating chamber known as a smokehouse. Ordinarily, the smoke is mixed with air in an air circulating system that circulates the smoke-laden air over and around the product in the smokehouse. Treatment of products of this kind in a smokehouse may be utilized to impart flavor and odor to the food, to cure the food, and to modify the texture of the food.

The substantial quantities of smoke required for processing as described above are usually produced by heating some smoke-producing material that liberates smoke of the desired characteristics when heated to a given temperature. During the heating process, the smoke-producing material may be reduced to an ash or may be partially consumed and reduced to an intermediate form. An example of the latter is the reduction of wood to charcoal. Most smokehouse generating installations employ wood sawdust for producing the desired smoke, and wood sawdust is the preferred smoke-producing material for the smoke generator of the present invention. In the following specification, it should be understood that references to sawdust are also intended to encompass other forms of dry particulate organic smoke-producing material. The sawdust may be derived from a variety of different woods including hickory, oak and others.

Smoke generating apparatus, as known in the prior art, is subject to a number of different problems and difficulties. One such difficulty pertains to unevenness in the volume of smoke produced. In food processing by smoke treatment, it is highly desirable that the smoke generator develop a constant volume of smoke, frequently over a rather extended period, to permit achievement of uniform results in the smoked food product. Uneven burning or decomposition of the smoke-producing material may cause substantial variations in the available volume of smoke, a quite unsatisfactory operating condition. To assure acceptably constant output, smoke generating apparatus as heretofore known has frequently required continuing adjustment and surveillance by skilled personnel, adding materially to the cost of operation of the smoke generating equipment.

Another prevalent difficulty with respect to smoke generating apparatus has to do with the accumulation of ashes, charcoal, and other waste materials within the smoke generator equipment. If permitted to accumulate within the smoke generator, materials of this kind may present a fire hazard. Moreover, failure to remove the ash and charcoal may lead to contamination of the smoke supply with small ash or charcoal particles which, if deposited on a food product, may degrade the product. The frequent cleaning necessary with such smoke generators materially reduces the available time for use of the smoke generators and again adds substantially to the cost of operation of this equpiment.

Another specific difficulty sometimes encountered in connection with smoke generators pertains to the supply of sawdust or like smoke-producing material used in connection therewith. Commercially available sawdust supplies frequently include relatively large particles or chips that cannot be handled by the smoke generator apparatus in the same manner as the fine particulate sawdust intended to be used therein. It is often difficult to exclude chips and other large particles entirely from the sawdust supply, with the result that these particles and chips may jam the equipment or cause other malfunctions. On the other hand, smoke generator equipment may present a definite fire hazard, particularly where the air supply to the smoke-producing equipment exceeds the actual requirements necessary for development of the requisite quantities of smoke. In this regard, it should be noted that smoke generation should be carried out in an oxygen-starved atmosphere to prevent the sawdust from bursting into flame.

It is an object of the present invention, therefore, to provide a new and improved smoke generator capable of producing a constant volume of smoke substantially free of objectionable solid particles, using ordinary sawdust or like dry particulate smoke-producing materials.

Another object of the invention is to provide a new and improved dry smoke generator that reaches full volume production of smoke in a relatively short period of time simply by starting operation of the smoke generator and without requiring adjustment or surveillance by skilled personnel.

Another object of the invention is to provide a new and improved dry sawdust smoke generator that effectively and efficiently cleans itself, in a matter of minutes, in each cycle of operation.

A specific object of the invention is to provide effective feeding of dry sawdust or like dry particulate smoke-producing material into a smoke generator, and to remove waste materials from that smoke generator, without introducing excessive quantities of air into the smoke-producing portion of the smoke generator. In particular, the present invention provides novel sealed inlet and waste valves making it possible to control the air input to the smoke generator, the input valve also effectively limiting the size of particles of sawdust introduced into the smoke generator.

Another object of the invention is to provide a simple and economical yet highly effective means for continuously agitating a quantity of sawdust while feeding the sawdust through a heating chamber to effect even charring and maximum efficiency in the operation of a dry sawdust smoke generator.

A further object of the invention is to utilize substantially the entire length of a continuous conveyor, within a dry sawdust smoke generator, in order to achieve maximum output from the smoke generator while maintaining minimum size.

Accordingly, the present invention relates to a dry smoke generator comprising an enclosed smoke generation chamber with a bed plate mounted therein and extending longitudinally of the chamber. Two such bed plates may be used, one mounted parallel to the other. A conveyor is mounted within the smoke generation chamber and extends along the bed plate or bed plates in contact therewith; this conveyor comprises a moving open mesh belt affording a multiplicity of rows of separate and discrete open cells, several cells per row that are accessible from above the bed plates and that are closed at the bottom by the bed plates. The smoke generator further includes inlet valve means for introducing sawdust or other particulate smoke-producing material into the chamber and distributing that material evenly across the bed plate into the individual cells of the conveyor. Waste valve means are provided for receiving and discharging ash, charcoal, and other waste material from the smoke generation chamber, this waste valve means being spaced from the inlet valve means by a substantial length of the conveyor and bed plate. Means are provided for heating the smoke-producing material as it traverses the bed plate (or plates) between the inlet and waste valve means, generating smoke therefrom and reducing the smoke-producing material to charcoal or ash. Appropriate outlet means are provided for removing smoke from the chamber as it is generated.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention.

In the drawings:

FIG. 1 is a side elevation view, partly cut away, of a dry sawdust smoke generator constructed in accordance with a preferred embodiment of the present invention;

FIG. 2 is an end elevation view of the smoke generator of FIG. 1, taken from the right-hand end thereof;

FIG. 3 is a detail sectional view of the inlet valve means utilized to introduce dry sawdust or other smoke-producing material into the smoke generator of FIG. 1, and is taken approximately along line 3—3 in FIG. 2;

FIG. 4 is a detail view of an agitator incorporated in the inlet valve means of FIG. 3;

FIG. 5 is a sectional elevation view of the smoke generation chamber of the smoke generator taken approximately along line 5—5 in FIG. 2;

FIG. 6 is a detail sectional view taken approximately along line 6—6 in FIG. 5;

FIG. 7 is a detail sectional view taken approximately along line 7—7 in FIG. 5;

FIGS. 8 and 9 are detail views of the open mesh conveyor belt utilized in the smoke generator of FIGS. 1–7;

FIG. 10 is a detail sectional view of the waste valve means incorporated in the smoke generator of FIGS. 1–7;

FIG. 11 is a sectional view, on a reduced scale, taken approximately along line 11—11 in FIG. 10; and FIG. 12 is a schematic diagram of the electrical control system and drive system for the smoke generator.

GENERAL DESCRIPTION

FIGS. 1 and 2 illustrate, in side and end elevation views respectively, a smoke generator 20 constructed in accordance with a preferred embodiment of the present invention. Smoke generator 20 comprises a housing 21 that is insulated on all sides. Housing 21, which is supported upon appropriate legs 22, defines a totally enclosed and substantially sealed smoke generation chamber 23. Housing 21 may be provided with suitable access doors on either or both sides thereof to facilitate occasional inspection and cleaning.

At the right-hand end of housing 21, as seen in FIG. 1, inlet valve means 24 are mounted on the housing. The inlet valve means 24, which communicates with the interior of smoke generation chamber 23, is employed to introduce sawdust or other particulate smoke-producing material into the smoke generation chamber. A separate hopper 25 is located above inlet valve means 24 and affords a continuous supply of sawdust for the smoke generator.

A conveyor generally designated by reference numeral 30 is located within smoke generation chamber 23. Conveyor 30 is of the continuous type and extends across two bed plates 27 and 28 that are located within smoke generation chamber 23 and that extend longitudinally of the chamber in parallel spaced relation to each other. Conveyor 30 comprises a moving open mesh belt 26 that contacts both of the two plates 27 and 28. The construction of the conveyor belt is such that it affords a multiplicity of separate open cells of substantial height (i.e., one-fourth inch) that are accessible from above the bed plates and that are closed below by engagement with the bed plates. The right-hand portion of conveyor belt 26 is engaged and driven by one or more drive sprockets 29 whereas the left-hand portion of the conveyor belt passes over appropriate idler sprockets 31.

Smoke generator 20 further includes waste valve means 32 for receiving and discharging waste material comprising ash and charcoal resulting from complete or partial combustion of the sawdust or other smoke-producing material within smoke generation chamber 23. Waste valve means 32 is spaced from inlet valve means 24 by a substantial length of conveyor 30 comprising the full lengths of the two bed plates 27 and 28. Thus, although the waste valve means 32, like the inlet valve means, is located at the right-hand end of the smoke generator as seen in FIG. 1, the material reaching the waste valve must pass along virtually the entire length of conveyor belt 26, first along the upper bed plate 27 and then back in the opposite direction along the lower bed plate 28. As the material traverses this path, it is continuously heated to generate smoke within chamber 23, the heating means being described in detail hereinafter.

Smoke generator 20 is provided with a smoke outlet 33 connected to a duct 34 leading to a smokehouse or other equipment in which the smoke is utilized for processing purposes. Duct 34 may be provided with an appropriate damper 35 for balancing the flow of smoke from the generator. A clean-out port 36 may be provided in duct 34 immediately opposite smoke outlet 33 to permit convenient cleaning of the smoke outlet. Duct 34 is extended downwardly a short distance from smoke outlet 33 to afford a tar trap 37, which is preferably provided with a removable cap or other access opening to enable removal of condensed tars and like waste products.

A drive unit 38, including a conventional electric motor, 39, is mounted beneath housing 21 in the central portion thereof. Drive unit 38 includes a drive sprocket 39 engaging a main drive chain 41, the other end of drive chain 41 being engaged with sprocket 42 on a countershaft 43. Chain 41, and the other drive chains described hereinafter, may constitute a conventional roller chain. Gear belts or other drive members may be employed if desired.

As shown in FIG. 2, countershaft 43 carries a sprocket 44 that is engaged by a conveyor drive chain 45, chain 45 extending around a sprocket 46 mounted upon the main conveyor drive shaft 47 that carries conveyor belt sprockets 29 (FIG. 1). At the opposite end of countershaft 43 from sprocket 44, as shown in FIG. 2, another sprocket 48 is mounted on the countershaft and this sprocket is engaged by a drive chain 49, the other end of chain 49 engaging a drive sprocket 51. The drive sprocket 51 is connected through a manually operable clutch 52, which may be of conventional construction, to an inlet valve drive shaft 53. The end of shaft 53 opposite the connection to clutch 52 carries a sprocket 54 that is connected by a chain 55 to a sprocket 56 on an agitator drive shaft 57.

Countershaft 43 also is provided with an additional sprocket engaged by a chain 58 that in turn engages a drive sprocket 59 mounted upon a waste valve drive shaft 61. Whenever motor 39 is energized, the chain drive arrangement described above continuously rotates conveyor drive shaft 47 and waste valve drive shaft 61. The inlet valve drive shaft 53 and the agitator drive shaft 57, on the other hand, are rotated only when clutch 52 is engaged.

Above the central portion of smoke generator 20 a control panel 63 is mounted upon housing 21. Control panel 63 includes appropriate switches, indicating instruments, and signal lights, and houses the controls for the smoke generator as described in detail hereinafter.

When smoke generator 20 is to be placed in operation, hopper 25 is first filled with clean, dry sawdust or other appropriate dry particulate smoke-producing material. A preferred form of material is dry sawdust that can be passed through a one-fourth inch mesh screen. Clutch 52 is preferably disengaged when the hopper is first filled. Care should be taken to assure the use of sawdust that is free of strings, slivers, and metal objects.

Before smoke generation is started, the heating system of the smoke generator, described hereinafter, is set in operation. Heating should be continued until the interior of chamber 23 reaches a temperature of the order of 720° F.; the actual operating temperature may vary to a considerable extent due to variations in the sawdust supply and other related factors. While smoke generation chamber 23 is heating, drive unit 38 is energized so that conveyor 30 is continuously operated during the warm-up period. The outlet valve means 32 is also driven, through shaft 61, but this has no effect upon the smoke generator since it may be assumed that the smoke generator was clean to begin with.

When the desired temperature is reached within smoke generation chamber 23, clutch 52 is engaged. As a consequence, inlet valve shaft 53 and agitator shaft 57 start rotating. The resulting initiation of operation of inlet valve means 24 begins a continuous steady discharge of sawdust from hopper 25 onto conveyor 30. Sawdust is distributed evenly across conveyor belt 26; the rate of discharge from inlet valve means 24 is such that all of the sawdust settles into the multiplicity of open cells defined by the open mesh conveyor belt. The sawdust is carried by the conveyor belt across bed plate 27, being continuously agitated as it moves across the bed plate. The engagement of the conveyor belt with the bed plate affords a continuous cleaning action for the bed plate, preventing the deposit of any substantial amount of sawdust or waste material on the bed plate.

As the sawdust reaches the point on conveyor belt 26 adjacent the left-hand end of the upper bed plate 27, and passes beyond the end of that bed plate, it falls through the open mesh belt and onto the lower bed plate 28. The sawdust is then carried back along bed plate 28 until it reaches the end of that bed plate and again falls through the mesh and into waste valve means 32. As the sawdust traverses bed plates 27 and 28, it is continuously heated and carbonized, producing a heavy volume of dry smoke that is drawn off from chamber 23 through smoke outlet 33 and duct 34.

By the time the sawdust reaches waste outlet means 32, it is no longer sawdust; it has been reduced to charcoal or to ash. The waste material is accumulated at the waste valve means 32 and is periodically discharged from the chamber into an appropriate container (not shown).

In most processing installations requiring the use of a smoke generator, smoke is required at spaced periodic intervals in a clearly defined processing cycle. Thus, smoke generator 20 will usually be required to operate to produce smoke for a predetermined period, will then be shut down for a further period, and subsequently will start another smoke generation period. A few minutes before the end of the smoke generation period, clutch 52 is disengaged. Upon disengagement of the clutch, the drive connection to inlet valve shaft 53 and to agitator shaft 57 is broken, interrupting the feed of sawdust into smoke generation chamber 23. Drive unit 38 remains energized, however, so that the conveyor 26 and the waste valve means 32 remain in operation. As a consequence, any sawdust and other waste material remaining in the machine are carried to the waste outlet means 32 and discharged from smoke generation chamber 23. This effectively shuts off all smoke generation in the machine and at the same time automatically cleans the major working components of the smoke generator. It is then possible to de-energize drive unit 38 and to shut off the heating equipment so that the smoke generator may be shut down completely. On the other hand, if a subsequent cycle of smoke generation is required at a subsequent period of the same day, the smoke generator may be permitted to idle, leaving the heaters and the drive unit in operation. It then becomes a simple matter to initiate a further cycle of smoke generation simply by engaging clutch 52 to start the feed of sawdust into the smoke generator again.

During operation of the smoke generator, the supply of sawdust in hopper 25 may approach exhaustion. This condition can be readily observed through a window 65 mounted in the side of the hopper (FIG. 1). For even operation of the smoke generator, hopper 25 should be re-filled whenever the level of sawdust is reduced to a point where it can be seen in window 65. During intervals in which smoke is not being generated, it is also possible to inspect the smoke outlet 33 by opening port 36, to make sure that the smoke outlet is not becoming clogged and that a free passage is available for the smoke to flow out of chamber 33 and into the outlet duct 34.

THE INLET VALVE MEANS

The inlet valve means for smoke generator 20 is illustrated in the enlarged sectional detail view of FIG. 3, the agitator portion of the inlet valve means further being shown in the detail view of FIG. 4. The upper portion of the inlet valve means comprises a sheet metal housing 71, the upper end of which is open to receive sawdust from hopper 25. Agitator shaft 57 extends across the upper portion of the inlet valve means 24 encompassed by housing 71. Shaft 57, which is continuously rotated when smoke is being generated, carries a plurality of agitator pins 72. Each of the pins 72 extends through a diametrical opening in the shaft and is secured to the shaft by appropriate means such as a pair of cotter pins, illustrated by the pins 73. The distribution of the agitator pins 72 along the length of shaft 57 and the angular orientation of the agitator pins can be seen in FIGS. 3 and 4. In the illustrated arrangement, there are a total of six agitator pins 72, but the number of pins or other agitator elements utilized can be varied to suit the input requirements and size of the smoke generator.

The lower portion 75 of housing 71, below agitator shaft 57, is tapered inwardly along two opposite sides, the tapered sides terminating in a pair of elongated arcuate valve wall segments 76 and 77. Each of the arcuate wall segments 76 and 77 is approximately 120° in extent, leaving a 60° opening 78 at the top thereof and a 60° opening 79 at the bottom. Wall segments 76 and 77 extend from the far wall of housing 71 to the near wall, which has been cut away, so that the segments constitute a downward extension of the inwardly tapered portion 75 of the housing. Segments 76 and 77 may be conveniently and inexpensively formed from conventional steel tubing cut longitudinally to afford wall segments of the required arcuate configuration. Below the arcuate segments 76 and 77, housing 71 is continued by a pair of vertical walls 81 and 82. The complete housing is preferably welded together to afford a substantial dust-tight and air-tight structure.

Input valve shaft 53 extends longitudinally of and is axially centered with respect to the two arcuate valve wall segments 76 and 77 of housing 71. Shaft 53 carries an elongated feeder rotor 84, constituting a rotary valve member, that is affixed to the shaft for rotation therewith. The rotary valve member 84 may be keyed to the shaft or otherwise fixedly mounted thereon; if preferred, shaft 53 and feeder rotor 84 may be machined from a single unitary rod.

The circumference of feeder rotor 84 is provided with twelve longitudinally extending feeder grooves 85. It is not essential that this precise number of feeder grooves be utilized; the number may be increased or decreased to suit the dimensional requirements of smoke generators of different sizes. Grooves 85 are not symmetrical with respect to the direction of rotation, which is indicated in FIG. 3 by arrow A. Thus, and as illustrated in connection with the particular feeder groove 85A, the leading portion of the feeder groove is of arcuate cross-sectional configuration having a radius 86 approximately equal to the maximum depth of the groove. The trailing portion of the groove, however, is at an angle B of approximately 60° to the radius 87 extending through the center of the groove. Thus, the leading portion of each groove extends abruptly inwardly of the circumference of the feeder rotor, approximately normal to the surface thereof, in a relatively deep pocket, but the trailing portion is tapered and re-joins the circumferential surface at an obtuse angle.

A clean-out slot 88 is formed longitudinally of the arcuate housing segment 77. Slot 88 is closed by a cover member 89 preferably provided with a neoprene or other resilient sealing element 91. Cover member 89 is mounted upon a hinge 92 secured to the inwardly tapered wall 75 of housing 71 and is held in position by means of a retaining bolt 93 and a wing nut 94 or other appropriate fastening means.

When the smoke generator hopper 25 is loaded with sawdust, the sawdust fills the upper portion of housing 71, down to the opening 78 that is closed by feeder rotor 84. The sawdust does not pass around the feeder rotor, which has only a very small clearance from the internal surfaces of the arcuate housing segments 76 and 77. As long as feeder rotor shaft 53 is stationary, inlet valve means 24 does not supply any sawdust to the smoke generation chamber 23 of the smoke generator.

When sawdust is to be fed to the smoke generator, shafts 53 and 57 are rotated in the directions indicated by the arrows A and C respectively. Rotation of shaft 53 and rotor 84 causes sawdust to be transported, in the longitudinal feed grooves 85, from opening 78 in the valve to opening 79, from which the sawdust drops downwardly into smoke generation chamber 23. In this manner, an even continuous supply of sawdust is fed to chamber 23. Housing 71 extends across chamber 23 for approximately the full width of conveyor belt 26 (see FIGS. 1 and 2) and distributes the sawdust evenly across the conveyor. The continuing rotation of agitator shaft 57 causes the agitator pin 72 to stir up the sawdust as it feeds into the valve portion of the mechanism, preventing agglomeration of the sawdust and assuring uniform distribution of sawdust across the width of the feeder.

The size and shape of the grooves 85 in feeder rotor 84, and the speed of rotation of shaft 53, determine the quantity of sawdust fed into smoke generation chamber 23 in any given period of time. Thus, the valve means 24 can be constructed to afford a controlled uniform rate of sawdust feed to enable the smoke generator to char the sawdust steadily and uniformly and with maximum efficiency. By maintaining hopper 25 with an adequate supply of sawdust, excess leakage of air into chamber 23 is avoided. Undue air leakage is also prevented by the relatively close fit between the peripheral surface of valve rotor 84 and the arcuate housing segments 76 and 77.

The shape of slots 85 is also of some importance in connection with the functioning of the inlet valve means 24. Any oversize particles of sawdust, chips, or other foreign material larger than the particle size of the sawdust that enters the groves 85 tends to be scraped from the feeder grooves over the flattened trailing surface thereof and back into the upper part of housing 81. That is, the shape of the grooves 85 inherently tends to expel oversize particles from the valve portion of the inlet feeder without jamming the feeder. This operation is assisted by the fact that the upper opening 78 in the valve portion of the inlet feed means 24 is wide enough to encompass more than one of the feed grooves or slots 85. It will be recognized that the joints in the housing 71 should be effectively sealed and that the clean-out opening cover 89 should be tightly gasketed to help prevent introduction of excess oxygen into smoke generation chamber 23.

THE COMBUSTION APPARATUS

The basic combustion apparatus of smoke generator 20 is illustrated in FIGS. 5, 6 and 7 and the detailed construction of conveyor belt 26, constituting an important feature of the combustion apparatus, is shown in FIGS. 8 and 9.

Referring to FIGS. 5 and 7, it is seen that there is an opening 101 in the top wall of housing 21 immediately below the valve opening 79 of inlet valve means 24. Through opening 101, sawdust is discharged into combustion chamber 23 from the inlet valve means.

Immediately below opening 101, a three-sided trough 102 is mounted within smoke generation chamber 23, extending completely across the smoke generation chamber as shown in FIGS. 5 and 7. The bottom portion of trough 102 is open, and this is also true of the part of the trough facing forwardly of opening 101 toward the main part of chamber 23. But the back of the trough is closed by an inwardly sloping wall 103 as illustrated in FIG. 5. The sides of trough 102 also slope inwardly. Trough 102 guides the sawdust discharged downwardly into chamber 23 onto the initial portion of conveyor belt 26 immediately over the right-hand end portion of bed plate 27 as shown in FIG. 5.

Bed plate 27, as may be seen in FIGS. 6 and 7, is of generally channel-shaped construction, the sides of the bed plate being provided with upwardly extending flanges to prevent spilling of sawdust over the sides of the bed plate. Preferably, plate 27 is constructed of stress-relieved steel plate. The bed plate is supported by a plurality of mounting brackets 105 that may be bolted, welded, or otherwise secured to the side walls of housing 21. A plurality of elongated electrical strip heaters 105 are fastened on the lower surface of bed plate 27 and are employed to heat the complete length of the bed plate so that the full span of the bed plate may be utilized for carbonization of the sawdust carried across the bed plate by conveyor belt 26.

The left-hand edge of bed plate 27, as illustrated in FIG. 5, is bent downwardly to afford a depending flange 106. The edge of the bed plate comprising flange 106 is spaced a short distance from the idler sprockets 31 constituting the left-hand end of conveyor 30. Thus, there is a space between the flange 106 and the end of the conveyor over which conveyor belt 26 passes without any means being afforded to close the bottom of the conveyor belt. A three-sided chute 107 is mounted across chamber 23 at this point in the chamber, as best shown in FIGS. 5 and 6. The transverse wall 108 of chute 107 is inclined downwardly to the right, as seen in FIG. 5, to guide sawdust falling through conveyor belt 26 beyond the end of bed plate 27 downwardly and onto a lower portion of conveyor belt that is located above the second bed plate 28.

Some of the sawdust may adhere to the conveyor belt and be carried beyond the chute 107 that guides most of the sawdust downwardly onto the lower run of the conveyor. To prevent loss of control of this material, a scoop 109 is mounted immediately below the portion of the conveyor 30 comprising the sprockets 31. As seen in FIG. 5, the configuration of scoop 109 is such as to conform rather closely to the configuration of the conveyor as it passes around the idler sprockets. The left-hand portion of the scoop is secured to the end wall of housing 21. The scoop is provided with side walls 111 to prevent lateral escape of the sawdust. The right-hand end of the scoop is tapered to merge with the leading edge of the lower bed plate 28 so that sawdust reaching the scoop will be picked up by the conveyor and carried on across bed plate 28.

Bed plate 28 is similar in construction and configuration to bed plate 27, being provided with longitudinally extending edge flanges to prevent escape of any sawdust over the sides of the bed plate. A plurality of elongated electrical strip heaters 115 are mounted on the lower surface of bed plate 28 and extend throughout the length of the bed plate from immediately below chute 107 to a point spaced from the right-hand end of conveyor 30 as illustrated in FIG. 5. Thus, heaters 115 provide for heating of the bed plate and consequent heating and carbonization of the sawdust passing over the bed plate throughout substantially the full length of the bed plate. Bed plate 28 is supported upon appropriate mounting brackets 114 secured to the side walls of the smoke generator housing.

The right-hand end of plate plate 28, as illustrated in FIG. 5, terminates at a chute 116 that extends across the lower right-hand end of chamber 23. Chute 116 is open at the top and at the bottom and all four walls of the chute taper downwardly toward each other and toward a discharge opening 117 that leads to the waste valve means 32 of the smoke generator. That is, opening 117 receives the waste material constituting charred or completely burnt sawdust that drops from the open mesh conveyor belt 26 beyond the right-hand end of bed plate 28 (FIG. 5) and feeds the waste material into waste valve means 32, which is described in detail hereinafter in connection with FIGS. 10 and 11.

The preferred construction for the open mesh conveyor belt 26 of conveyor 30 is shown in detail in FIGS. 8 and 9. As illustrated therein, the conveyor belt is an open mesh structure of the kind referred to in the trade as a "flat wire" belt. This belt is constructed from a multiplicity of thin flat metal strips 118 bent in a repetitive inverted U-shaped configuration and overlapped with each other to afford a multiplicity of individual cells 119 that are closed on four sides but open on two sides. The thin flat metal strips 118 are hingedly connected in the requisite overlapping relationship by a multiplicity of elongated pins or wires 121, the ends of the pins 121 being upset as indicated by reference numberal 122 to hold the resulting mesh together. In a typical flat open mesh belt of this kind, the longitudinal and lateral dimensions of each of the cells 119 may be of the order of one-half inch and the height of the cells, defined by the width of the metal strips 118, may be approximately one-fourth inch.

In operation of the combustion apparatus illustrated in FIGS. 5-9, and with particular reference to FIG. 5, sawdust or other dry particulate smoke-producing material is discharged through valve opening 79 by the revolving-door action of rotor 84 and falls downwardly through opening 101 in housing 21. The sawdust thus discharged into smoke generation chamber 23 falls evenly across the width of conveyor belt 26, on the upper run of the conveyor belt which is moving to the left as seen in FIG. 5. The sawdust is prevented from falling onto that portion of the conveyor belt beyond the right-hand end of bed plate 27 by the inclined wall 103 of trough 102.

As shown in FIG. 8, the sawdust 124 is evenly distributed in the cells 119 of conveyor belt 26. At the point on the conveyor where the sawdust impinges upon the conveyor belt, the bottom of each of the cells is closed, because the conveyor belt rests directly upon bed plate 27 (FIGS. 5 and 7). The inwardly inclined side walls of trough 102 prevent escape of the sawdust over the sides of the conveyor belt. The longitudinal flanges on bed plate 27 similarly act to prevent escape of the sawdust over the sides of the conveyor system. The rate of discharge of sawdust into the smoke generator is regulated to prevent over-filling of the conveyor belt cells 119, so that there is no mass of sawdust lying across the top of the conveyor belt; that is, all of the sawdust settles down into the individual cells of the conveyor.

As conveyor 26 moves the sawdust 124 in cells 119 across bed plate 27, the sawdust is continually tumbled and stirred due to the scraping action of the conveyor across the surface of the bed plate. As a result, the sawdust is evenly heated by contact with the bed plate and starts to develop smoke within the chamber 23. This process, including agitation and stirring of the sawdust, continues throughout the movement of the sawdust along the length of the bed plate.

As the sawdust reaches the end 106 of bed plate 27, most of it falls through the open mesh conveyor belt and is guided by wall 108 of chute 107 onto conveyor 26 at the left-hand end of the lower bed plate 28. A relatively small quantity of the sawdust, which at this point is partly carbonized, may adhere to the conveyor belt and may be carried around the sprockets 31. Any sawdust dislodged from the conveyor belt in this portion of its travel falls into scoop 109 and is again picked up and carried forward by the motion of the conveyor onto bed plate 28.

The movement across bed plate 28 is a direct repetition of that across bed plate 27. The sawdust is continually tumbled and agitated by the conveyor belt as it is scraped across the conveyor belt and is evenly and continuously heated by contact with the hot bed plate. Smoke generation is completed on this movement of the sawdust, which reaches chute 116 in the form of charcoal or ash. The charcoal and ash material drops through the open mesh and is guided into discharge opening 117 by chute 116. Some of the waste material may cling to the open mesh belt as it comes up around the drive sprockets 29, but any such material that drops off of the conveyor belt as the belt rounds the drive sprockets is caught in chutes 116 and ends up dropping out the discharge opening 117.

The continuous tumbling action afforded by the conveyor system of the present system, comprising the multiple-cell open mesh belt 26 and the bed plates 27 and 28, promotes even, continuous charring of the sawdust as it moves through the smoke generation chamber. As a consequence, and also due to the continuous even feeding of sawdust onto the conveyor, the volume of smoke available from smoke generator 20 remains substantially constant over extended periods of time, once smoke generation has been initiated. The charring temperature can be closely maintained by control of the strip heaters 105 and 115. By using both of the longitudinal runs of conveyor belt 26, including the full length of each of the bed plates 27 and 28, maximum output is achieved in a smoke generator of minimum size.

The combustion apparatus of smoke generator 20 is also advantageous in that it is inherently self-cleaning in its operation. As noted above, when a smoke generation cycle is completed, the feeding of sawdust into the combustion chamber is interrupted but the conveyor 30 continues to operate. By continuing operation of the conveyor through several cycles after the supply of sawdust has been shut off, the surfaces of the bed plates 27 and 28 are scraped clean by the conveyor and the conveyor itself shakes off particles that may be clinging to the conveyor belt. As a consequence, cleaning difficulties within the combustion chamber are materially reduced.

THE WASTE VALVE MEANS

FIGS. 10 and 11 afford sectional views of the waste valve means 32 employed to discharge charcoal and ashes from the combustion chamber of the smoke generator. As shown therein, waste valve means 32 is located directly below the discharge opening 117 in the bottom of the smoke generator housing and includes a generally rectangular depending housing 131. Within housing 131, there are a pair of inwardly tapered side walls 132 and 133 affixed on their upper ends to the sides of the housing 131. The lower ends of the inwardly tapering walls 132 and 133 are secured to two arcuate wall segments 134 and 135, respectively, which extend back to and are secured to the side walls of housing 131.

The waste valve drive shaft 61 extends transversely of housing 131 and is axially aligned in symmetrical relation with the arcuate wall segments 134 and 135. A pair of discs 136 and 137 are secured to shaft 61 immediately adjacent the end walls of housing 131, as shown in FIG. 11. Discs 136 and 137 are provided with aligned U-shaped radial openings, as best illustrated in the drawings by the opening 138 in disc 136, FIG. 10. A seamless steel tube 139 is welded or otherwise secured to the two discs 136 and 137, tube 139 having a longitudinal slot cut therein to conform to the U-shaped openings 138 in the two discs. A U-shaped trough member 141 conforming in configuration to the disc apertures 138 is also mounted between the two discs, in effect extending the apertures 138 the full length of the cylinder defined by the tubing 139. Thus, discs 136 and 137, tube 139, and trough member 141 define a rotary valve member 140 of cylindrical configuration having a single longitudinal feeder groove or trough defined by member 141.

The external diameter of tubing 139 is only very slightly smaller than the internal diameter of the two arcuate wall segments 134 and 135, which may be cut from sections of steel tubing. Consequently, a relatively good seal is afforded by the waste valve structure comprising the cylindrical valve member 140, preventing ready access of air to the interior of the smoke generator combustion chamber.

Outlet valve means 32 affords a revolving-door action that is in most respects rather similar to that provided by the inlet valve means described hereinabove. During operations of the smoke generator, the rotary valve member 140 comprising tubing 139 and trough member 141 rotates continuously as indicated by the arrow D. Charcoal, ash, and other waste material dropping down through opening 117 is funnelled by the inwardly projecting walls 132 and 133 into the trough or pocket member 141. Continuing rotation of the valve brings trough member 141 over the opening 142 and the waste material drops out through the bottom of housing 131 and into a suitable container (not shown). During time intervals in which trough member 141 is not aligned with the opening 143 between the lower ends of the inclined walls 132 and 133, the waste material accumulates on the outer surface of cylinder 139. The accumulation is picked up by trough member 141 when it next comes into alignment with opening 143.

It is thus seen that waste valve means 32 affords efficient and continuing discharge of waste material from the combustion chamber while at the same time preventing an inflow of air which would supply oxygen conducive to starting a fire in the smoke generator. The flow of air through the valve is always restricted due to the relatively close fit between cylinder 139 and the arcuate wall segments 134 and 135.

The hot ashes discharged through opening 142 are often still smoking and may include sparks and tiny live coals. To avoid a smoke nuisance from the discharged material, a water spray comprising a spray nozzle 145 is preferably mounted within the discharge opening to extinguish any sparks and to suppress further smoking of the discharged material.

CONTROL SYSTEM

FIG. 12 illustrates a control system 150 for smoke generator 20. The control system is energized by a conventional three phase power supply comprising the power lines 151, 152 and 153. The primary winding of a control transformer 154 is connected to two of the power conductors 151 and 152. The secondary winding of transformer 154 is connected to a pair of control power lines 155 and 156. A first indicator light 157 is connected directly across the control power lines 155 and 156 to afford a positive indication that power is available for operation of the smoke generator.

Control system 150 includes a motor control relay 158 having an operating coil 159 and four sets of normally open contacts 161, 162, 163 and 164. Contacts 161, 162 and 163 are utilized to connect the three input leads of the three phase motor 39 to the power supply conductors 151, 152 and 153 respectively. One terminal of coil 159 is connected to control conductor 156 and the other terminal of the relay coil is connected through the series combination of a start switch 165 and a stop switch 166 to the other control power conductor 155. The normally open contacts 164 of relay 158 are connected in parallel with the start switch 165. A drive indicator light 167 is connected in parallel with the relay operating coil 159. The start and stop switches 165 and 166 are momentary-contact devices but may be mechanically connected for operation from a single lever or other operating member if desired.

Control system 150 further includes a pair of heater control relays 168 and 178. The first heater control relay 168 is provided with an operating coil 169 and includes three pair of normally open contacts 171, 172 and 173 that are utilized to connect heaters 105 to the three phases 151, 152 and 153 of the main power supply. Similarly, heater control relay 178 includes an operating coil 179 and three pair of normally open contacts 181, 182 and 183 employed to connect the heaters 115 to the three phase power supply.

The two relay operating coils 169 and 179 are connected in parallel with each other, with one terminal of each of the coils directly connected to control power conductor 156. The other terminal of each of the relay coils is connected through the series combination of two thermostatic switches 184 and 185 and a heater control switch 186 to the remaining control power conductor 155. Thermostatic switch 184 is an operating temperature control device and is set to open at a temperature corresponding to that desired for heating of the sawdust within the smoke generator; as noted above, this temperature may be of the order of 720° F. Thermostat 185 on the other hand, is set to open at a substantially higher temperature of the order of approximately 800° F. and constitutes a fire protection device. Thermostat 185 is a single-pole double-throw device, the other terminal of the thermostatic switch being electrically connected to a timer 187 that is in turn connected to a control valve solenoid 188, solenoid 188 being returned to power supply conductor 156.

A heater indicator light 189 is connected in parallel with the operating coils of heater control relays 168 and 178.

When the smoke generator 20 is installed, the three phase power conductors 151–153 are suitably connected to an external power supply by an appropriate disconnect switch (not shown), energizing control transformer 154. As a consequence, a low voltage alternating current supply is established for control system 150 on the conductors 155 and 156. Indicator lamp 157 remains lit as long as the power supply is connected and power is available for operation of the smoke generator.

To start the conveyor system in operation, which requires energization of motor 39, start switch 165 is closed, completing an energizing circuit for coil 159. Upon closing of the start switch and energization of the relay coil, contacts 161–164 all close. The closing of contacts 164 establishes a holding circuit for the relay in parallel with the start switch, keeping the relay energized and energizing lamp 167 to indicate that the drive system is electrically connected to the power supply. Closing of contacts 161–163 energizes motor 39 to drive the conveyor system and the waste valve means of the smoke generator as described above. It may be noted again that the energization of the drive motor does not actuate the sawdust feeder comprising input valve means 24, which depends upon actuation of clutch 52 (FIG. 2).

To energize heaters 105 and 115, switch 186 is closed. Upon closing of this switch, lamp 189 is energized, as are relay coils 169 and 179. Energization of the relay coils actuates the relays, closing contacts 171–173 and 181–183. As a consequence, both sets of heaters 105 and 115 are energized.

Continued energization of heaters 105 and 115 ultimately causes the low temperature thermostat 184 to open, de-energizing the heaters when the desired operating temperature is reached. Thermostat 184 continues to open and close, depending upon the temperature within the smoke generator chamber, maintaining the temperature at the desired level. An appropriate indicating instrument (not shown in FIG. 12) can also be incorporated in the system to indicate the actual instantaneous temperature within the smoke generator chamber.

If an excessive amount of air is present within the smoke generator chamber, combustion of the sawdust or other smoke-producing material within the chamber may be accelerated. Under these circumstances, representing an unusual operating condition, the temperature within the chamber may reach an excessive level sufficient to actuate the high temperature thermostat switch 185. Upon actuation of switch 185, timer 187 is energized. If excessive temperature conditions are maintained, as indicated by continued actuation of thermostat switch 185, over a predetermined time interval, timer 187 operates to complete an electrical circuit to solenoid 188, actuating a control valve (not shown) to discharge carbon dioxide or other inert gas into the combustion chamber of the smoke generator and extinguish the fire. The carbon dioxide discharge may be located at any desired point within chamber 23; a typical location is indicated in FIG. 5 by the $CO_2$ discharge conduit 191. It should be noted that the likelihood of a fire within the smoke generator is quite low and that, in normal operation, valve solenoid 188 is never energized.

When it is desired to interrupt operation of the smoke generator, switch 186 is opened to de-energize the heater control relays 168 and 178. This causes the relay contacts to drop out, opening the operating circuits for both sets of heaters 105 and 115. The conveyor drive is interrupted by actuation of stop switch 166, opening the operating circuit for coil 159 of the motor control relay 158. When the motor control relay drops out, the opening of contacts 161–163 is effective to de-energize motor 39. At the same time, contacts 164 drop out, breaking the holding circuit for the motor control relay.

SUMMARY

From the foregoing description, it will be apparent that the smoke generator of the present invention produces a substantially constant volume of smoke, using ordinary sawdust or like dry particulate smoke-producing material, without requiring particular attention from an operator other than to switch the generator on when smoke is desired and to switch it off at the end of a smoke generation cycle. The continuous tumbling action of the conveyor apparatus used in the smoke generator promotes even heating of the sawdust and thus aids materially in maintaining a constant flow of smoke from the generator. Continuous even operation is also materially assisted by the revolving-door inlet valve means utilized to deposit the sawdust on the conveyor. The smoke generator reaches its full volume production of smoke in a relatively short time. Moreover, the system is inherently self-cleaning in its operation.

The possibility of fire within the smoke generator is held to a minimum by the effectively sealed inlet and outlet valves of the smoke generator. The inlet valve means also is effective to prevent the introduction of excessively large particles of sawdust or of foreign material into the interior of the smoke generator and avoids jamming difficulties that can result therefrom. By using both runs of the continuous conveyor in the smoke generator, the overall size of the smoke generator required to produce a given volume of smoke is materially reduced.

Hence, while preferred embodiments of the invention have been described and illustrated, it is to be understood that they are capable of variation and modification.

I claim:
1. A dry smoke generator for producing smoke suitable for food processing by charring of organic sawdust in an oxygen-starved atmosphere comprising:
   an enclosed smoke generation chamber;
   first and second electrically heated bed plates mounted within said chamber in parallel vertically spaced relation to each other and extending longitudinally thereof, and each having longitudinal flanges to prevent escape of sawdust over the sides of said bed plates;
   a continuous belt conveyor mounted within said chamber, said conveyor having two parallel flat runs each extending along a respective one of said bed plates in contact therewith, said conveyor comprising a moving open mesh belt of light-gauge metal affording a multiplicity of separate shallow open cells arranged in transverse rows each including a plurality of cells accessible from above said bed plates and closed at the bottom by said bed plate;
   inlet valve means for introducing sawdust into said chamber and distributing the sawdust across one end of the upper one of said bed plates and into said conveyor cells;
   chute means for guiding partially charred sawdust falling through a portion of said open mesh conveyor belt extending beyond the other end of said upper bed plate onto one end of the lower bed plate;
   waste valve means for receiving, and discharging from said chamber, waste material dropping through a portion of said open mesh conveyor belt extending beyond the other end of said lower bed plate;
   and outlet means for removing smoke from said chamber.

2. A dry smoke generator for producing smoke suitable for food processing by charring of organic sawdust in an oxygen-starved atmosphere comprising:
   an enclosed smoke generation chamber;
   a flat metal bed plate mounted within said chamber and extending longitudinally thereof;
   a conveyor mounted within said chamber and extending along said bed plate in contact therewith, and beyond said bed plate, said conveyor comprising a continuous moving open mesh flat wire belt comprising a multiplicity of thin flat metal strips each bent in a repetitive reverse U-shaped pattern hingedly connected together in overlapping relation by a multiplicity of hinge rods to afford a multiplicity of separate shallow open cells arranged in transverse rows each including a plurality of cells accessible from above said bed plate and closed at the bottom by said bed plate;
   inlet valve means for introducing organic sawdust material into said chamber and distributing said material into said conveyor cells;
   waste valve means for receiving and discharging from said chamber waste material falling through said conveyor in the portion of said conveyor extending beyond said bed plate;
   means for heating said bed plate to heat said material as it traverses said bed plate between said inlet and waste valve means to generate smoke therefrom; and outlet means for removing smoke from said chamber.

3. A dry smoke generator for producing smoke suitable for food processing by charring of organic sawdust in an oxygen-starved atmosphere comprising:
an enclosed smoke generation chamber;
a bed plate mounted within said chamber and extending longitudinally thereof;
a conveyor mounted within said chamber and extending along said bed plate in contact therewith, said conveyor comprising a moving open mesh belt of light-gauge metal affording a multiplicity of separate shallow open cells arranged in transverse rows each including a plurality of cells accessible from above said bed plate and closed at the bottom of said bed plate;
inlet valve means for introducing organic sawdust material into said chamber and distributing said material into said conveyor cells at a given point on said bed plate;
waste valve means for receiving and discharging waste material from said chamber, said waste valve means being spaced from said inlet valve means by a substantial length of said conveyor and said bed plate;
each of said valve means comprising an elongated cylindrical rotary valve member having at least one longitudinal feeder groove therein, mounted in closely spaced relation in a partial-cylinder valve housing having longitudinal inlet and outlet openings, the spacing between said valve member and valve housing effectively limiting the passage of air through the valve means;
means for heating said material as it traverses said bed plate between said inlet and waste valves to generate smoke therefrom;
and outlet means for removing smoke from said chamber.

4. A dry smoke generator for producing smoke suitable for food processing by charring of organic sawdust in an oxygen-starved atmosphere comprising:
an enclosed smoke generation chamber;
conveyor means for transporting smoke-producing material along a predetermined path from an inlet point to a discharge point within the smoke generation chamber;
inlet valve means for depositing dry organic sawdust material of given particle size on said conveyor means, at said inlet point,
said inlet valve means comprising an elongated rotary valve member of circular cross-section having a plurality of shallow longitudinally extending feeder grooves therein,
means for rotating said valve member in a given direction,
and a partial-cylindrical valve housing disposed in closely spaced partially encompassing relation to said rotary valve member, said valve housing having longitudinal inlet and outlet openings,
each of said shallow feeder grooves having a leading portion extending abruptly inwardly of the circumferential surface of said rotary valve member and a trailing portion joining that circumferential surface at an obtuse angle to prevent jamming of said valve means by passage of objects grossly exceeding said particle size through said inlet valve means;
heating means for heating said material as it moves along said path;
waste valve means for receiving, and discharging from said chamber, waste material reaching said discharge point;
and outlet means for removing smoke from said chamber.

5. A dry smoke generator for producing smoke suitable for food processing by charring of organic sawdust in an oxygen-starved atmosphere comprising:
an enclosed smoke generation chamber;
a metal bed plate extending longitudinally of said chamber;
conveyor means, including an open mesh multi-cell metal belt, for transporting smoke-producing material along a predetermined path extending along said bed plate from an inlet point at one end of said bed plate to a discharge point located beyond the other end of said bed plate;
inlet valve means for depositing dry organic sawdust material of given particle size on said conveyor means, at said inlet point,
said inlet valve means comprising an elongated rotary valve member of circular cross-section having a plurality of shallow longitudinally extending feeder grooves therein,
means for rotating said valve member in a given direction,
and a partial-cylindrical valve housing disposed in closely spaced partially encompassing relation to said rotary valve member, said valve housing having longitudinal inlet and outlet openings,
each of said shallow feeder grooves having a leading portion extending abruptly inwardly of the circumferential surface of said rotary valve member and a trailing portion joining that circumferential surface at an obtuse angle to prevent jamming of said valve means by passage of objects grossly exceeding said particle size through said inlet valve means;
electrical heating means for heating said bed plate to char said material as it moves along said path;
waste valve means for receiving, and discharging from said chamber, waste material passing through said open mesh belt at said discharge point;
and outlet means for removing smoke from said chamber.

6. A dry smoke generator for producing smoke suitable for food processing by charring of organic sawdust in an oxygen-starved atmosphere comprising:
an enclosed smoke generation chamber;
a metal bed plate extending longitudinally of said chamber;
conveyor means, including an open-mesh multi-cell metal belt, for transporting smoke-producing material along a predetermined path extending lengthwise of said bed plate from an inlet point at one end of said bed plate to a discharge point located beyond the other end of said bed plate;
inlet valve means for depositing dry organic sawdust material on said conveyor means, at said inlet point;
electrical heating means for heating said bed plate to char said material as it move along said path;
waste valve means for receiving, and discharging from said chamber, waste material reaching said discharge point,
said waste valve means comprising an elongated cylindrical rotary valve member having a single deep longitudinally extending feeder trough therein,
a partial-cylindrical valve housing disposed in closely spaced partially encompassing relation to said rotary valve member, said valve housing having diametrically opposed longitudinal inlet and outlet openings, the arcuate extent of said valve housing, relative to said feeder trough, being sufficient to maintain said waste valve means effectively closed to the passage of air at all times;
and outlet means for removing smoke from said chamber.

7. A dry smoke generator for producing smoke suitable for food processing by charring of organic sawdust in an oxygen-starved atmosphere comprising:
an enclosed smoke generation chamber;
conveyor means, comprising a multi-cell conveyor belt, for transporting smoke-producing material along a predetermined path from an inlet point to a discharge point within the smoke generation chamber;

inlet valve means for depositing organic sawdust material on said conveyor means, at said inlet point, said inlet valve means comprising an elongated rotary inlet valve member of circular cross-section having a plurality of shallow longitudinally extending feeder grooves therein, and a segmented cylindrical inlet valve housing disposed in closely spaced partially encomprassing relation to said rotary inlet valve member, said inlet valve housing having longitudinal inlet and outlet openings, each of said feeder grooves having a leading portion extending abruptly inwardly of the inlet member surface and a trailing portion joining that surface at an acute angle to prevent jamming by oversize objects;

heating means for heating said material as it moves along said path;

waste valve means for receiving, and discharging from said chamber, waste material reaching said discharge point, said waste valve means comprising an elongated cylindrical rotary waste valve member having a single deep longitudinally extending feeder trough therein, and a segmented cylindrical waste housing disposed in closely spaced partially encompassing relation to said rotary waste valve member, said valve housing having longitudinal inlet and outlet openings;

and outlet means for removing smoke from said chamber.

8. A dry smoke generator for producing smoke suitable for food processing by charring of organic sawdust in an oxygen-starved atmosphere comprising:

an enclosed smoke generation chamber;

first and second electrically heated bed plates mounted within said chamber in parallel vertically spaced relation to each other and extending longitudinally thereof, and each having longitudinal flanges to prevent escape of sawdust over the sides of said bed plates;

a conveyor mounted within said chamber and extending along said bed plates in contact therewith, and beyond each of said bed plates, said conveyor comprising a continuous moving open mesh flat wire belt comprising a multiplicity of thin flat metal strips each bent in a repetitive reverse U-shaped pattern hingedly connected together in overlapping relation by a multiplicity of hinge rods to afford a multiplicity of separate open cells accessible from above each of said bed plates and closed at the bottom by said bed plates;

inlet valve means for introducing sawdust of given particle size through said inlet valve means;

sawdust across one end of the upper one of said bed plates and into said conveyor cells;

said inlet valve means comprising an elongated rotary valve member of circular cross-section having a plurality of longitudinally extending feeder grooves therein, means for rotating said valve member in a given direction, and a partial-cylindrical valve housing disposed in closely spaced partially encompassing relation to said rotary valve member, said valve housing having longitudinal inlet and outlet openings, each of said feeder grooves having a leading portion extending abruptly inwardly of the circumferential surface of said rotary valve member and a trailing portion joining that circumferential surface at an obtuse angle to prevent jamming of said valve means by passage of objects grossly exceeding said particle size through said inlet valve means;

electrical heating means for heating said bed plate to char said smoke-producing material as it moves along said path;

chute means for guiding partiallly charred sawdust falling through a portion of said open mesh conveyor belt extending beyond the other end of said upper bed plate onto one end of the lower bed plate;

waste valve means for receiving, and discharging from said chamber, waste material dropping through a portion of said open mesh conveyor belt extending beyond the other end of said lower bed plate;

said waste valve means comprising an elongated cylindrical rotary valve member having a single deep longitudinally extending feeder trough therein, and a partial-cylindrical valve housing disposed in closely spaced partially encompassing relation to said rotary valve member, said valve housing having diametrically opposed longitudinal inlet and outlet openings, the arcuate extent of said valve housing, relative to said feeder trough, being sufficient to maintain said waste valve means effectively closed to the passage of air at all times;

and outlet means for removing smoke from said chamber.

References Cited

UNITED STATES PATENTS

| | | | |
|---|---|---|---|
| 1,496,054 | 6/1924 | Illingworth | 202—117 X |
| 1,522,985 | 1/1925 | Taff | 202—117 |
| 1,671,300 | 5/1928 | Macdonald et al. | 219—388 |
| 2,335,611 | 11/1943 | Pray | 202—117 |

JOSEPH V. TRUHE, Primary Examiner

R. F. STAUBLY, Assistant Examiner

U.S. Cl. X.R.

202—117; 252—359